(12) United States Patent
McLaren et al.

(10) Patent No.: US 10,476,872 B2
(45) Date of Patent: Nov. 12, 2019

(54) JOINT SPEAKER AUTHENTICATION AND KEY PHRASE IDENTIFICATION

(71) Applicant: SRI International, Menlo Park, CA (US)

(72) Inventors: Mitchell Leigh McLaren, Sunnyvale, CA (US); Aaron Dennis Lawson, San Jose, CA (US)

(73) Assignee: SRI International, Menlo Park, CA (US)

( * ) Notice: Subject to any disclaimer, the term of this patent is extended or adjusted under 35 U.S.C. 154(b) by 201 days.

(21) Appl. No.: 15/013,580

(22) Filed: Feb. 2, 2016

(65) Prior Publication Data

US 2016/0248768 A1 Aug. 25, 2016

Related U.S. Application Data

(60) Provisional application No. 62/118,930, filed on Feb. 20, 2015, provisional application No. 62/181,333, filed on Jun. 18, 2015.

(51) Int. Cl.
| | |
|---|---|
| *G10L 15/00* | (2013.01) |
| *H04L 29/06* | (2006.01) |
| *G10L 15/22* | (2006.01) |
| *G10L 17/22* | (2013.01) |
| *G10L 17/18* | (2013.01) |

(Continued)

(52) U.S. Cl.
CPC ......... *H04L 63/0861* (2013.01); *G10L 15/22* (2013.01); *G10L 17/22* (2013.01); *H04L 63/10* (2013.01); *G10L 15/16* (2013.01); *G10L 15/183* (2013.01); *G10L 17/18* (2013.01); *G10L 2015/223* (2013.01)

(58) Field of Classification Search
CPC .................................................. H04L 63/0861
See application file for complete search history.

(56) References Cited

U.S. PATENT DOCUMENTS

| | | | |
|---|---|---|---|
| 7,013,283 B1 | 3/2006 | Murdock et al. | |
| 2004/0249650 A1* | 12/2004 | Freedman | G06Q 30/02 |
| | | | 705/7.29 |

(Continued)

OTHER PUBLICATIONS

Larcher, et al.; "I-Vectors in the Context of Phonetically-Constrained Short Utterances for Speaker Verification"; published in IEEE International Conference on Acoustics, Speech and Signal Processing (ICASSP); 2012; 4 pages.

(Continued)

*Primary Examiner* — Ashokkumar B Patel
*Assistant Examiner* — Syed M Ahsan
(74) *Attorney, Agent, or Firm* — Hickman Palermo Becker Bingham LLP; Christine E. Orich

(57) ABSTRACT

A spoken command analyzer computing system includes technologies configured to analyze information extracted from a speech sample and, using a joint speaker and phonetic content model, both determine whether the analyzed speech includes certain content (e.g., a command) and to identify the identity of the human speaker of the speech. In response to determining that the identity matches the authorized user's identity and determining that the analyzed speech includes the modeled content (e.g., command), an action corresponding to the verified content (e.g., command) is performed by an associated device.

33 Claims, 5 Drawing Sheets

(51) Int. Cl.
*G10L 15/16* (2006.01)
*G10L 15/183* (2013.01)

(56) References Cited

U.S. PATENT DOCUMENTS

2010/0131273 A1* 5/2010 Aley-Raz ............... G10L 17/24
  704/247
2012/0245941 A1* 9/2012 Cheyer .................. G06F 21/32
  704/246
2013/0339018 A1  12/2013 Scheffer et al.
2015/0081302 A1* 3/2015 Syrdal ................... G10L 17/24
  704/249
2015/0112684 A1* 4/2015 Scheffer ................ G10L 17/14
  704/257
2016/0042739 A1* 2/2016 Cumani ................. G10L 17/06
  704/239
2016/0098987 A1* 4/2016 Stolcke ................ G10L 15/063
  704/232
2016/0119338 A1* 4/2016 Cheyer .................. G06F 21/32
  726/4

OTHER PUBLICATIONS

McLaren, et al.; "Advances in Deep Neural Network Approaches to Speaker Recognition"; published in IEEE International Conference on Acoustics, Speech and Signal Processing (ICASSP); 2015; 5 pages.

Song, et al.; "I-Vector Representation Based on Bottleneck Features for Language Identification"; published in Electronics Letters, vol. 49, Issue 24; Nov. 21, 2013; 2 pages.

* cited by examiner

JOINT SPEAKER AUTHENTICATION AND KEY PHRASE IDENTIFICATION

RELATED APPLICATION(S)

This application claims the benefit of and priority to U.S. Provisional Patent Application No. 62/118,930, filed Feb. 20, 2015, and U.S. Provisional Patent Application No. 62/181,333, filed Jun. 18, 2015, the contents of each of which are incorporated herein by the reference in its entirety.

GOVERNMENT RIGHTS

This invention was made in part with government support under contract number D10PC20024 awarded by the Department of Defense's Defense Advanced Research Projects Agency and under contract number #DE-AC04-94AL85000 awarded by Sandia National Laboratories under the Department of Energy. The United States Government has certain rights in this invention.

TECHNICAL FIELD

This invention relates generally to speech processing, and more particularly to recognition of a speaker based on a sample of the speaker's speech and recognition of the content of the sample of the speaker's speech.

BACKGROUND

Traditionally, a universal background model (UBM) is used to analyze acoustic signals for speaker recognition. The UBM outputs numerical acoustic indices that do not correspond to the phonetic or lexical content of the input speech signal. Speech content and the distortions it produces in the acoustic signal have been largely ignored in prior work on text-independent speaker verification.

A deep neural network (DNN) is a feed-forward neural network that is both much larger (e.g., a few thousand nodes per hidden layer) and much deeper (e.g., 5-7 hidden layers) than traditional neural networks.

Moreover, prior approaches to performing combined speech content and speaker recognition usually involved applying different and separate analyses to the received speech information, either in parallel or series. This is because the models used for each type of analysis focus on different aspects of the speech signal. Such approaches, however, can be overly time or processing resource consuming, thereby limiting real time determinations or requiring the speech data to be transferred to remote server devices for processing. Such approaches limit the scope of applications for speech analysis systems and are also highly language dependent.

BRIEF DESCRIPTION OF THE DRAWINGS

The above needs are at least partially met through provision of the joint speaker authentication and key phrase identification described in the following detailed description, particularly when studied in conjunction with the drawings, wherein.

Figure 1:
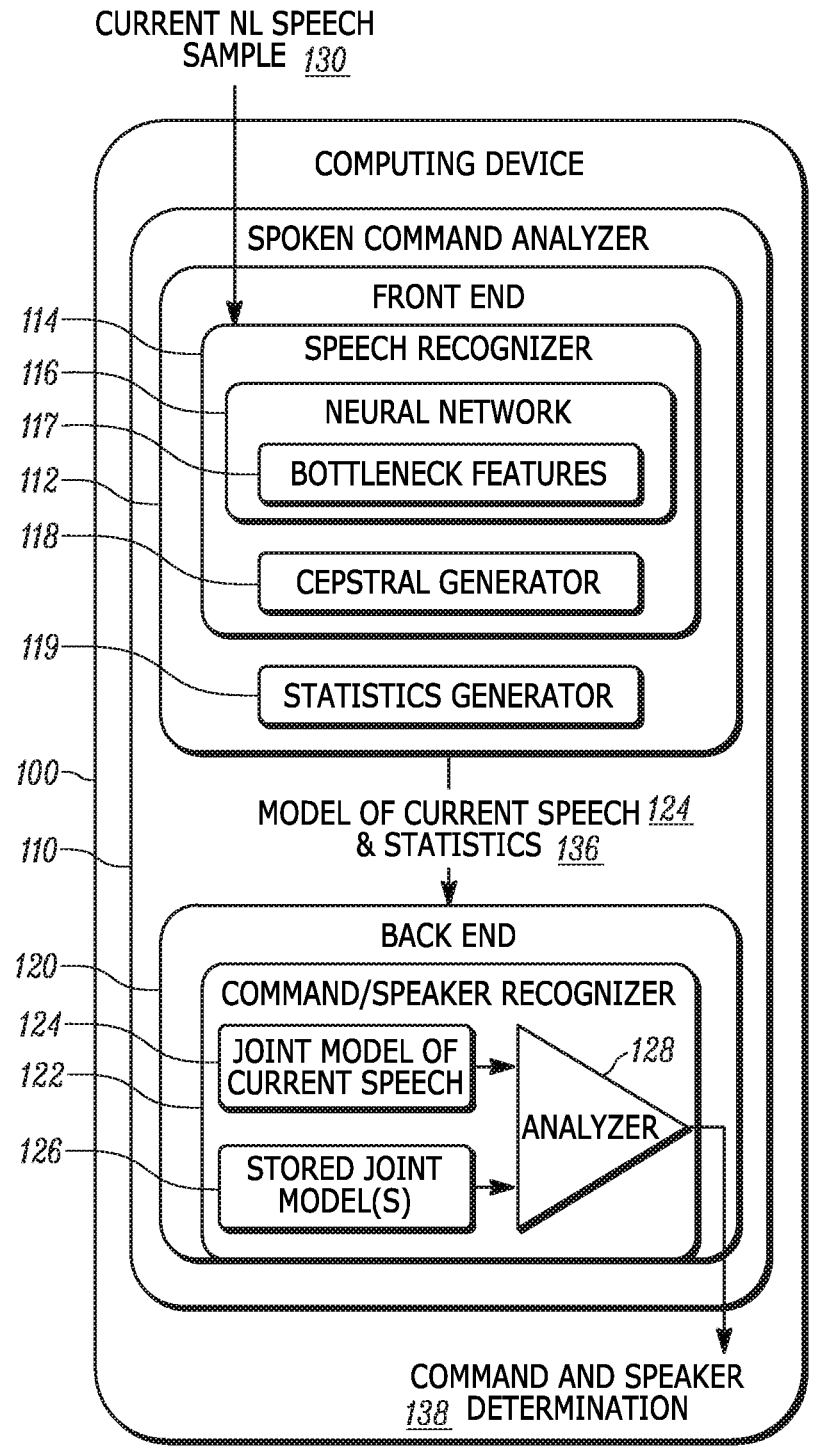
FIG. 1 comprises a simplified module diagram of an environment of at least one embodiment of a computing system for performing phonetically-aware command/speaker recognition as disclosed herein in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, and pursuant to these various embodiments, a spoken command analyzer module is configured to, given a sample of human speech, jointly analyze speech information extracted from the sample to determine whether the analyzed speech includes specific content, such as a command, and to verify the identity of the human speaker of the speech. As used in this context, "jointly" refers to the ability to both authenticate the identity of a speaker of a speech sample and authenticate the content of the speech of the speech sample using the same process. In other words, only one input speech sample is used to both verify the speaker and authenticate the content of the speech sample to the speaker. That is, using a single input speech sample, the speaker of the speech sample can be identified, and content of the speech sample (e.g., a command, such as "unlock my car") can be determined, and the system can determine whether the identified user is authorized to request that the determined action (command) be performed by the system (e.g., is the speaker linked with the command in a way that indicates that the speaker is authorized to issue the command?). To do this, the disclosed technologies can use a single model to perform both speaker verification and verification of the content of a speech sample. An action corresponding to the spoken command is performed by the associated device in response to a match between the speech sample and a joint speaker and content model. This is based on the device's determination that the identity of the speaker of the sample matches the authorized user's identity and that the speech sample includes content representing an authorized command for the verified user to invoke. The "joint" or "combined" speaker and content model models both user-specific and command-specific acoustic properties of a user's speech. The "joint" speaker and content model can be implemented as, e.g., a phonetic model or a i-vector. For example, an i-vector for a short phrase (preferably 2 to 5 seconds, and more preferably 2 to 3 seconds) can be extracted from training data obtained either during an explicit enrollment process or passively collected as the user speaks in the normal course of operating the device. This i-vector extraction process is designed to include information salient to both text identification and speaker identification. This i-vector allows for comparison similarly constructed i-vectors from later captured speech to jointly (e.g., simultaneously) determine both text and speaker identification.

So configured, a computing device can readily determine both the content of a speech sample and speaker identification for a short phrase, which phrase can be used as, e.g., a command that may be an order for operation of a device or a request for a service. The short (in terms of time duration) nature of the speech sample and joint analysis of content and speaker identification allows for essentially real time (or interactive-time) content and speaker determination without needing to access a remote speaker model. Thus, the short phrase can be readily used as a real time (or interactive-time), spoken command or request that is specific to the user/speaker, such that the device or system will only execute the command if the user's identity and the command both match the joint content and speaker model. The disclosed approach also allows the user(s) to establish a variety of commands (which are modifiable by a given user) to effect different actions for a given associated device. For instance, the user may specify that "Shazam!" (as spoken by the user) unlocks a car door but does not unlock the front door to the user's house, whereas the user may specify that "open sesame" (as spoken by the user) unlocks the liquor cabinet inside the user's house. As such, the user's 11-year old child speaking the command "Shazam!" would not result in the car door unlocking, and if the child were to say "open sesame," the system would recognize that the child is not authorized to speak that command, and the liquor cabinet would not be unlocked.

Referring now to FIG. 1, a computing system 100 includes an embodiment of a spoken command analyzer module or system 110, shown in the context of an environment that may be created during the operation of the computing system 100 (e.g., an online or offline execution or "runtime" environment). The spoken command analyzer system 110 and portions thereof are embodied as a number of software and/or hardware computer-readable modules, components, and/or data structures, in accordance with the requirements of a particular design or implementation of the system 110. As used herein, "spoken command analyzer system" refers to a combined voice biometric system and speech recognition system. A "voice biometric system" generally refers to an automated system for identifying or confirming the identity of the speaker of a sample of speech. In general, voice biometric systems seek to determine the person who has spoken (in contrast to speech recognition systems, which seek to determine the verbal content, e.g., words and phrases, that have been spoken).

The computing system 100 receives data such as audio input signals including samples of natural language (NL) speech 130, from time to time, through an audio capture/acquisition device such as a microphone. An audio signal that includes an NL speech sample 130 may also be referred to as a "speech signal." As used herein, "natural language" may refer to, among other things, words, phrases, verbal expressions, and/or combinations thereof, in human speech (as distinguished from, for example, computer generated codes, such as CAPTCHAs—"Completely Automated Public Turing tests to tell Computers and Humans Apart").

A front end module 112 of the spoken command analyzer system 110 uses training data (one or more speech samples collected from the user) to create and store one or more joint content and speaker models 126 of the training data. This can be done during an enrollment process or passively during normal use of the user's device, for example. The stored joint content and speaker model 126 models both content specific and speaker specific features (e.g., acoustic properties) extracted from the user's training data. The stored joint content and speaker model 126 may be referred to herein as, for example, a phonetic model. During live operation of the system 110, the front end module 112 accepts and analyzes speech input that may be referred to as a "current" speech sample 130, and creates a joint content and speaker model 124 by extracting and analyzing both content specific and speaker specific features extracted from the current speech sample.

During live operation of the system 110, the stored model 126 is used by a back end module 120 of the spoken command analyzer system 110 to validate both the speaker and the content of the current speech sample 130. The training data used to create the stored model(s) 126 may include one or more stored (e.g., previously recorded) speech samples of the user. Once a model 126 is trained, the speech samples used to create the model need not be further stored. Based on the comparison of the current model 124 to the stored speech model(s) 126, the back end module 120 outputs a joint command and speaker determination 138.

The illustrative front end module 112 includes a speech recognizer subsystem 114 that associates speech segments of the current speech sample 130 with speech content, e.g., phonemic, phonetic, or lexical units such as phonemes, phones, tri-phones, or words. As used herein, "speech segment" may refer to, among other things, a portion of the input audio signal that contains the current NL speech sample 130 and/or a set of acoustic features that represents that portion of the speech signal. For example, a speech segment may constitute a portion of the speech sample 130 that is less than the entire sample 130. A speech segment may be referred to as a "time slice" or "frame" of the audio (speech) signal. The illustrative speech recognizer 114 aligns time with the phone-level content of the speech sample 130 so that the phonemic or phonetic content of each speech segment can be determined in the context of the temporally preceding and/or subsequent phonemic or phonetic content. In this sense, the illustrative speech recognizer 114 acts as a partial speech recognizer in that it does not require, e.g., language models or grammars. However, of course, a full automated speech recognition system (including language models and grammars) may be used in other embodiments.

A neural network-based acoustic model 116 of the speech recognizer 114 generates a bottleneck feature 117 output that is combined with cepstral features 118 separately derived from the current speech sample 130, which combined features are used to create a joint speaker and content model of the current speech, 124. The combination of bottleneck features 117 and cepstral features (e.g., the known Mel frequency cepstral coefficient (MFCC) or pcaDCT) allows for generation from the combination of a phonetic model (such as an i-vector) capable of analysis for both speaker identification and phonetic or text identification. These features are also provided to a statistics generator 119, which generates statistics 136 relating to the various features that can be further used for creation of the phonetic model. The statistics generator 119 may rely on the universal background model (UBM) to generate the described statistics.

To generate the joint command and speaker determination 138, a command/speaker analyzer 128 of the command/speaker recognizer 122 compares the similarities between the current phonetic model 124 and the stored phonetic model(s) 126 using speaker-specific production of the phonemic, phonetic, or lexical content (e.g., at the phone or tri-phone level), rather than simply relying on the traditional acoustic features alone. For example, the command/speaker recognizer 122 may use a probabilistic linear discriminant analysis (PLDA) to compare one or more phones or phonemic characteristics of the current phonetic model 124 to one or more similar phones or phonemic characteristics of the stored phonetic model(s) 126 and generate the command/speaker determinations 138. In another optional approach, during registration three samples of a command to be registered are collected from a user and are used to create a command model used as the stored phonetic model 126. A detection threshold for this command model is then determined by comparing each of the three registration samples against a model registered using the other two samples to give three different comparison scores. The command-dependent threshold is then determined as the average of these three scores offset with a bias and scaled with a set of parameters, bias and scale, learned on a development set, for example, by using the equation: cal_score=(mean(enroll_scores)−bias)/scale. This example process allows the system to make accurate decisions by accounting for variations in scores due to differing phonetic content of the command being registered. The analyzer 128 may include other features such as those described in U.S. provisional patent application No. 62/118,930, filed Feb. 20, 2015, the contents of which are incorporated by reference as if fully rewritten herein.

As used herein, "acoustic features" may refer to, among other things, discrete or continuous numerical values that each represent a characteristic of a raw acoustic (speech) signal. Acoustic features include numerical measurements of acoustic energy at different frequencies of the speech signal, which typically are calculated using a Fourier transform. Examples of acoustic features include the MFCC and filter banks. A frame of a speech signal can be represented as a vector of these and/or other acoustic features.

In comparison, phones and phonemes indicate the speech content of the individual frames of the acoustic signal. A "phone," as used herein, may refer to, among other things, an alphanumeric or symbolic notation that represents a single unique speech sound. For example, the pronunciation of "t" in "stick", "bittle", "bit" and "tick" represent physically different sounds (phones) due to their position in the word, despite being the same phoneme in English. Phones can be combined with other phones to form a word or other verbal expression in a human-spoken language. A phone may correspond to a single, regular variation in pronunciation of a vowel or consonant. In some cases, a combination of letters may produce a single phone (e.g., "th" and "ng"). Further, some letters of the alphabet produce different phones in different contexts (e.g., the short "a" in "rat" versus the long "a" in "rate"). A "phoneme" may refer to, among other things, the smallest unit of sound that has a distinct meaning to speakers of a particular language. For example, the pronunciation of "t" in "stick" and "tick" is similar enough in the English language that it is considered as the same phoneme, but the difference between the two pronunciations of "t" in another language may be significant and therefore constitute two different phonemes. Thus, the same phone may have different phonemic characteristics depending on the speaker's native language, for example. Phones can be denoted using a phonetic alphabet, such as the ARPAbet for American English or the International Phonetic Alphabet (IPA).

By associating phonetic or phonemic content with individual speech segments of the current NL speech sample 130, the spoken command system 110 can capture speaker-specific characteristics (e.g., pronunciations) of lexical units (e.g., phonemes, phones, tri-phones, tri-phone sequences, or other utterances). For example, if two speakers each say the word "car"—within other, non-matching speech content—and one speaker has a British accent while the other speaker has a Southern American accent, the spoken command system 110, or more particularly the command/speaker analyzer 128, can inherently compare the audio signal for the word "car" (a tri-phone) for both speakers. In this way, the spoken command analyzer 110 can distinguish between the two speakers by comparing portions of the audio signal that correspond to similar phonetic units, and thereby more accurately authenticate users. In contrast, traditional text-independent voice biometric systems, such as the GMM-UBM (Gaussian Mixture Model-UBM) approach, cannot leverage phonetic or phonemic information in speaker comparisons.

So configured, the front end 112 of the spoken command analyzer 110 is configured to integrate the phonetic or phonemic content of the speech sample (e.g., "speech content") directly with the speaker recognition analysis. This is in contrast to certain other systems that connect the speech recognizer and the speaker recognizer portions of the analysis "in series," for example, as that disclosed in United States Patent Application Publication No. 2015/0112684, which is incorporated herein by reference in its entirety. This is also in contrast to other systems that separately analyze the phone or word-level speech content and the low-level acoustic signals "in parallel," and then fuse or combine the results.

Figure 2:
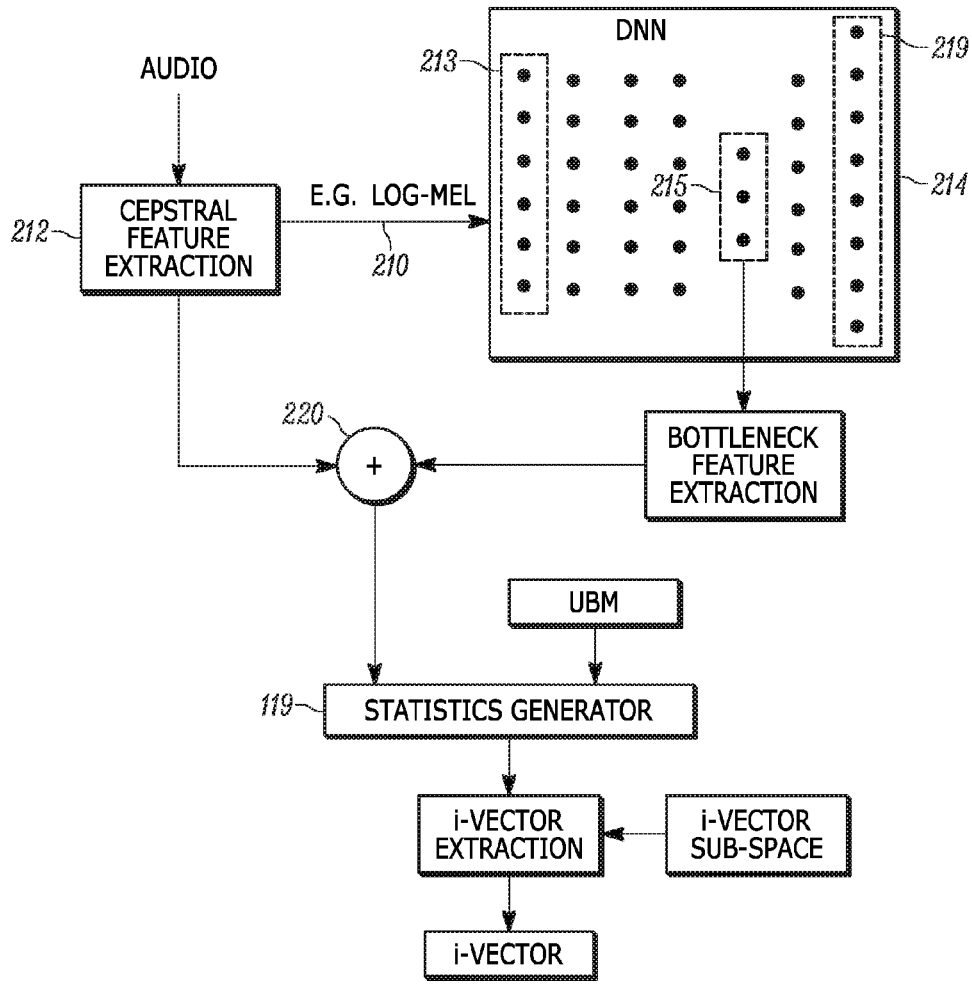
FIG. 2 comprises a simplified combined module and flow diagram of at least one embodiment of the neural network-based acoustic model of FIG. 1 as configured in accordance with various embodiments of the invention.

Referring now to FIG. 2, an embodiment of the use of a neural network-based acoustic model 116 in the front end module 112 is shown in more detail, in the context of an environment that may be created during the operation of the computing system 100 (e.g., an offline or online execution or "runtime" environment). The front end module 112 and portions thereof are embodied as a number of computer-executable modules, components, and/or data structures, including an acoustic feature extraction module 212 and a deep neural network (DNN) 214. The acoustic features 210 extracted with the acoustic feature extraction module 212 include, for example, acoustic feature vectors that have been previously computed for a number of different speech samples (e.g., speaker-specific or speaker-independent training data).

In the illustrated embodiments, the acoustic feature extraction module 212 is a cepstral feature extraction module 212 that derives cepstral features such as MFCC for the current speech sample 130. Various cepstral feature extraction modules are known in the art and can be applied here. Separately, the acoustic features 210 (often the log Mel-spectrum) are used to train the deep neural network 214 for automatic speech recognition (ASR). The ASR-trained DNN 214 is then used to associate phonetic content with the current speech sample 130. Typically, the DNN 214 outputs a phonetic representation of the current speech sample 130 (e.g., tri-phone sequences). In the illustrated example, however, the DNN 214 is modified to have a bottleneck layer 215 from which bottleneck features are derived.

More specifically, bottleneck features are a set of activations of nodes over time from a bottleneck layer in a trained DNN. The bottleneck layer 215 is a hidden layer in the DNN of reduced dimension relative to the other layers (e.g., 80 nodes compared to 1200). A DNN is trained to discriminate between different output classes such as senones, speakers, conditions, etc. Using a bottleneck layer in the DNN ensures that all information required to ultimately determine the DNN posteriors is restrained to a small number of nodes. The features extracted as activations of these nodes lend themselves well to tasks in which phonetic content is beneficial. Moreover, the position of the information bottleneck (or bottleneck layer) 215 can be close to the input layer 213, where the phonetic information in the resulting features is assumed to be relative low compared to that of a bottleneck layer placed close to the output layer 219 (assuming the DNN classes are senones or other phonetic units). In certain implementations, for example, a bottleneck in a layer located at a middle layer of or layer in a half-portion of a deep neural network closer to the deep neural network's outer layer is used for feature extraction. For instance, cepstral features can be appended to bottleneck features extracted from the deep neural network bottleneck layer 215 as described herein.

In one example implementation, the DNN 214 is a 5-layer DNN trained to have a bottleneck layer 215 of 80 nodes and 1200 nodes in every other hidden layer. The DNN is trained to predict 3494 senone outputs. In the example of FIG. 2, the bottleneck layer 215 is the fifth of seven layers, thereby closer to the output layer 219 that the input layer 213. The input features for the DNN 214 in one example includes 40 log Mel filterbank energies along with the energies from seven frames either side of a frame for a contextualized feature of 600 dimensions. Other training and modified approaches can be applied.

In the illustrated example, the cepstral features from the cepstral feature module 212 are appended to the bottleneck features extracted from the bottleneck layer 215 at 220. The combined feature set is then used to train the Universal Background Model (UBM). The statistics generator 119 integrates the combined features with alignments from the previously trained UBM to produce the speaker-specific statistics. With the combined feature set and statistics configured in this fashion, the back end 120 may operate in the traditional way to create the phonetic model of the current speech, e.g., i-vector creation, and comparison of the stored models to the models of the current speech, without requiring special modifications.

Figure 3:
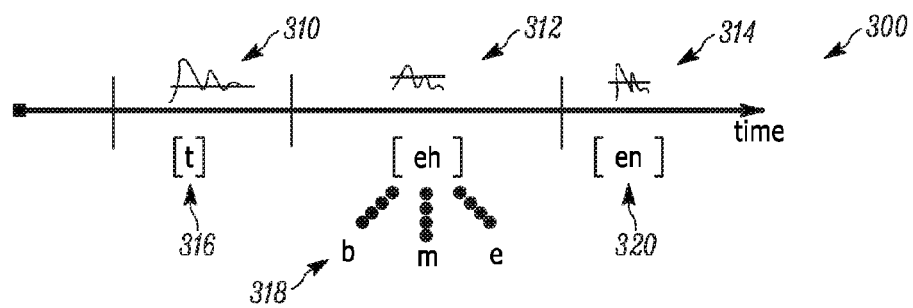
FIG. 3 comprises a simplified example of a phonetic representation of a speech sample that may be created by the computing system of FIG. 1.

Referring now to FIG. 3, a simplified illustration of a phonetic representation of a speech sample 300, which may be created by the computing system 100, is shown. The speech sample 300 is divided into time slices, and each time slice contains a speech segment, e.g., a portion of the acoustic signal, 310, 312, 314. Each speech segment is associated with corresponding speech content, in this case, the phones 316, 318, 320. Additionally, with reference to the phone 318, the phonetic state or context is illustrated in more detail (although the same analysis applies to any of the phones 316, 318, 320). The notation "b" refers to the beginning pronunciation of the phone, "m" refers to the middle portion of the phone, and "e" refers to the end of the phone 318. Thus, context can be determined with respect to each of the beginning, middle, and end states of the phone 318. The phonetic state or context of the phone 318 is also indicated by reference to the preceding phone 316 and/or the subsequently occurring phone 320. The temporal sequence of phones 316, 318, 320 constitutes a triphone.

Taking the illustration of FIG. 3 into the more specific context of the example of FIG. 2, the illustrated time slices 310, 312, 314 are provided to the deep neural network 214 and the cepstral feature extraction module 212 so the respective features from each time slice are extracted from the two analysis approaches. Those two different feature sets from the respective time slice are then provided as input to an i-vector extractor, which uses a model to transform the combined feature set into an i-vector consisting of, for example, 400 numbers. The i-vector is then analyzed by the analyzer 128 of FIG. 1 through comparison to the previously extracted and stored i-vectors using known comparison and scoring techniques to determine a statistical match. Because the compared i-vectors includes the described feature sets with both text and speaker depending features, this i-vector comparison and analysis jointly determines a match both for substantive content and for speaker identification. Thus, the i-vector creation and comparison inherently includes confirmation of both the substantive content and the speaker's identity without performing separates analyzes of the speech data.

Various advantageous functionalities are provided by such an approach. For example, the spoken command analyzer 110 is able to analyze the data to determine the substantive content of the speech independently of the language of the speech because the models are not trained to a particular language. Without being tied to a particular language, a command may include any combination of speech based phonetics. Thus in practice, a spoken command to cause a device to perform an action could be gibberish, i.e., not a recognized word or phone elements common for the speaker's native language. In one application, therefore, a user's spoken password can become particularly difficult to guess and impersonate as it need not be limited to a word or sound typical for a given language. Instead, through application of the technology described herein, a spoken password could include a phrase including phones from different languages mixed together.

Because the captured features used in building the i-vectors of this approach include speaker dependent features, i-vector comparison may further include analysis of the data to determine that the speech was non-recorded live speech from a living being human speaker as opposed to being recorded and re-played audio including speech. This can provide security against using a recording of a user's speech to provide unauthorized access to or control of the user's device. Additionally, the analysis of the data may include separation of the authorized user's speech data from contemporaneously captured speech from other human speakers. The phonemes associated with the other speaker's voices will result in i-vectors sufficiently different from those trained on the authorized user's voice to not result in a match, even if the other speakers speak registered commands for the associated device.

This flexibility also allows for one device to be responsive to a plurality of commands spoken by an authorized user. For instance, the speech data can be analyzed to determine whether the speech's substantive content includes one of a plurality of commands wherein individual ones of the plurality of commands correspond to respective different actions by the associated device, and in response to determining that the identity matches the authorized user's identity and determining that the data includes the one of the plurality of commands, issue an instruction to effect performance of an action by the associated device associated with the one of the plurality of commands in substantially real time relative to capturing the speech.

Two approaches can be used to train or enroll a user to be able to use a spoken command analyzer of the kind described. In one, the authorized speaker participates in an active enrollment process, which typically includes capturing the authorized speaker's reciting a given command three or more times. During the enrollment, the above process is run to build i-vectors from the enrollment speech samples, which i-vectors are then used to compare against later captured speech to determine whether to effect an action associated with the given command. One such example process may include receiving at least three samples of training data representative of speech by the authorized user including the command and analyzing the at least three samples of training data to determine respective stored phonetic models for the command including both content recognition features and speaker recognition features.

By another approach, the authorized user's speech is monitored over a period of time to create a sufficient database of samples that can be used by the analyzer 128 to compare to later captured speech. In one such example, a full speech recognition system operates over time to collect the user's speech, which is then analyzed over time to determine which phrases the user speaks to interact with a given device. Such an approach would be considered a type of automated command registration process. In either case, ongoing monitoring of the authorized user's voice can help further train the system to improve accuracy.

Figure 4:
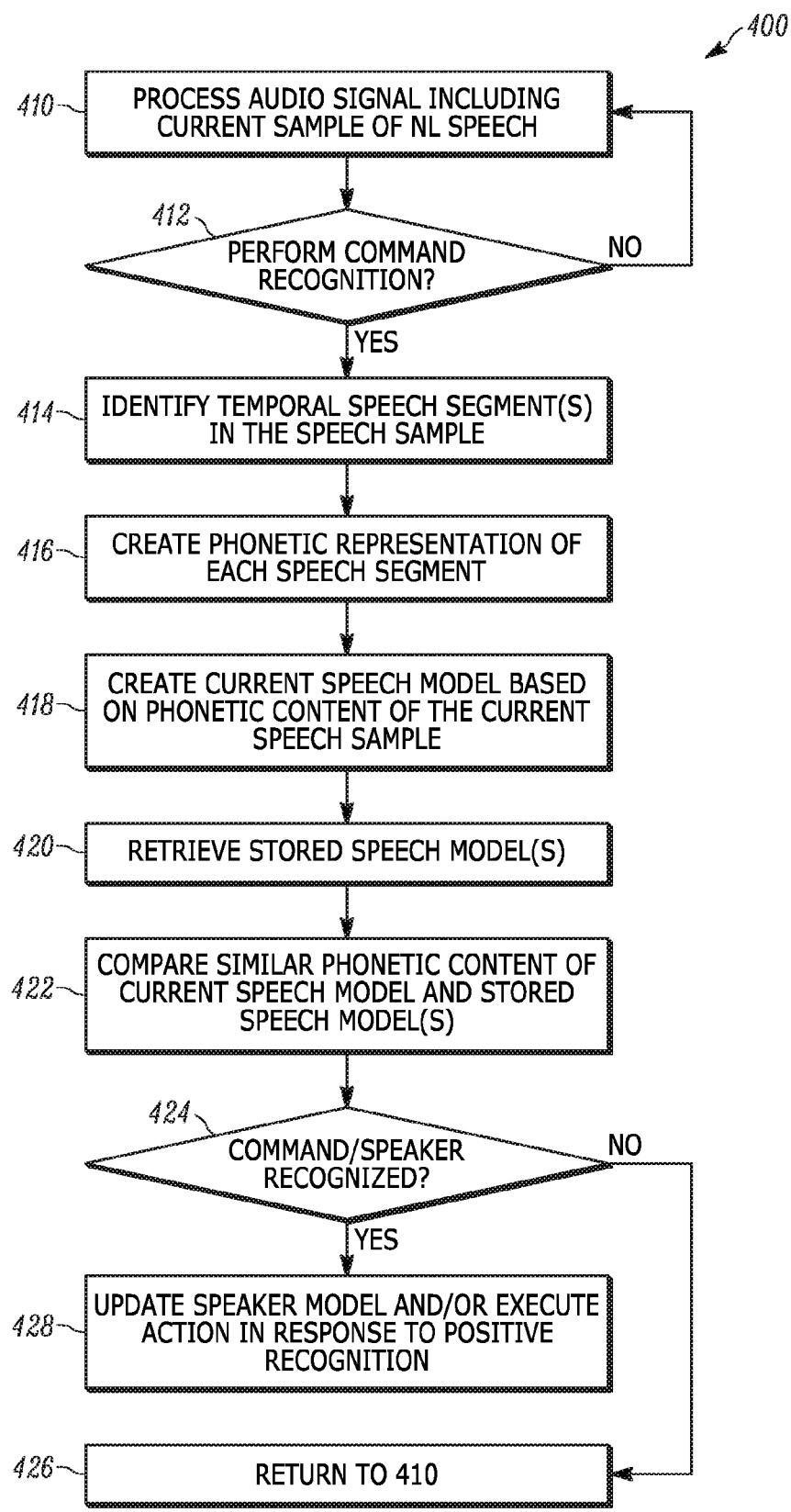
FIG. 4 comprises a simplified flow diagram of at least one embodiment of a method by which the computing system of FIG. 1 may perform command/speaker recognition as configured in accordance with various embodiments of the invention.

Referring now to FIG. 4, an illustrative method 400 by which the computing system 100 may perform command/speaker recognition is shown. The method 400 may be embodied as computerized programs, routines, logic and/or instructions executed by the computing system 100, for example by the voice biometric system 110. At block 410, the system 100 processes an audio signal containing a current sample of natural language speech. To do this, the computing system 100 may, for example, receive an analog speech signal by microphone, utilize an analog-to-digital converter (ADC) to convert the analog signal to digital form, and record the digital form of the speech sample to computer memory or data storage as an audio file. In some embodiments, the "live" speech signal may have been previously received and stored in memory or data storage, in which case the system may simply retrieve the audio file containing the speech sample from memory or data storage, as the case may be, at block 410.

At block 412, the system 100 determines whether to perform command/speaker recognition on the speech sample obtained at block 410. In the context of another computer application, such as a virtual personal assistant, the system 100 may determine that command/speaker recognition does not need to be performed on a current round of dialog because a command is not expected. Of course, the system 100 may determine that command/speaker recognition does or does not need to be performed for any number of other reasons, at block 412. If the system 100 determines that command/speaker recognition does not need to be performed, the system 100 returns to block 410 to process another speech sample. If the system 100 determines that command/speaker recognition is to be performed, the system 100 proceeds to block 414. At block 414, the system 100 identifies the temporal speech segments (or "time slices" or "frames") of the current speech sample. The temporal speech segments may correspond to, for example, the sampling rate of the ADC or a multiple of the sampling rate. In some cases, overlapping speech segments may be used to ensure that an important feature of the signal is not missed.

At block 416, the computing system 100 creates a phonetic representation of each speech segment of the speech sample obtained at block 410. To do this, the computing system 100 utilizes a phonetically-aware acoustic model (such as the neural network-based acoustic model 116 and cepstral feature extraction 118) to associate phonetic content (e.g., phonemes, phones or tri-phones) with each of the speech segments. The phonetic content may be associated with the corresponding speech segments by way of annotations, meta tags, data structures, or any other suitable methods. At block 418, the system 100 creates a current speaker model based on the phonetic content of the current speech sample. The current speaker model (e.g., a speaker model 124) may be embodied as a data structure having a number of "slots" or "fields" for storing data values including the speech segment (e.g., the acoustic signal or its acoustic features) and the phonetic content (which includes features sufficient to determine both the speech's substantive content and identification of the speech's speaker) determined at block 416. The current speaker model may be developed as an i-vector model as described above and in the above-referenced provisional patent application.

At block 420, the computing system 100 retrieves one or more stored speaker model(s) (e.g., stored speaker models 126) from, for example, memory or data storage. The illustrative stored speaker model(s) were created using a process substantially matching that which created the phonetic model of the current speech 124. The previously created models may have been developed through a formal enrollment process in which the speaker records a sample of speech specifically for use in later speaker verification. In other cases, the retrieved speaker model may be developed over time through a speaker's use of a speech-enabled computer application, such as a virtual personal assistant. In other words, some embodiments of the computing system 100 may execute a background process to automatically generate the stored model(s) from time to time in response to natural language speech that is captured/acquired during a speaker's normal use of another computer application, rather than through a formal enrollment process.

At block 422, the computing system compares the current speech model developed at block 418 to the stored model(s) retrieved at block 420. To do this, the computing system can use the information provided by the neural network-based acoustic model 116 in combination with the statistics computed by the statistics computation model 118 to determine phonetic content of the current model that is similar to phonetic content in a stored model 126 and disregard any other phonetic content that is not similar. For example, if both the current speech sample and a stored speech sample include the word "cat" (a tri-phone), the system 100 may analyze the similarity of the phonetic content of the word "cat" in the current model with the phonetic content of the word "cat" in the stored model. In some cases, the system 100 may analyze similarity at the phone or phoneme level, alternatively or in addition to the tri-phone level. The system 100 may generate a biometric score by computing the similarity between the current model 124 and the stored models 126 mathematically, e.g., using PLDA. If there are multiple stored models 126, the system 100 may analyze the similarity of the current model 124 to each of the stored models or a subset of the stored models 126 and make a match determination based on the similarity of the current model 124 to all or a subset of the stored models 126.

Example Usage Scenarios

The described approaches can be applied in a variety of use cases. For instance, because the analysis of short segments of speech is all that is necessary for monitoring for particular commands, the overall analysis need not wholly or even partially take place at a remote server. Instead, once training of the various modules is complete, the analysis of incoming audio for commands can be executed locally, which (depending on a given device's computing power) further improves execution of actions associated with an authorized user's commands in essentially real time. Moreover, the various approaches allow for highly secure command use because both substantive content (which is not necessarily language dependent) and speaker identification are part of the command determination such that people other than the authorized user are prevented from causing an unwanted action.

This combination of features lends itself to just about any application where security or speaker identification can provide benefits. One such application is the voice control of devices in the home or office. Such "smart" devices may comprise the so-called "Internet of Things" (IoT) where a user may speak commands to various devices to effect different actions for various devices and without worry of other people being able to effect such actions. For example, some users may want certain devices to be able to perform all available actions for one or other users, but certain users such as children may only have limited action available via voice command. Also, the same command may cause different actions for different users based on the speaker identification capabilities.

Figure 5A:
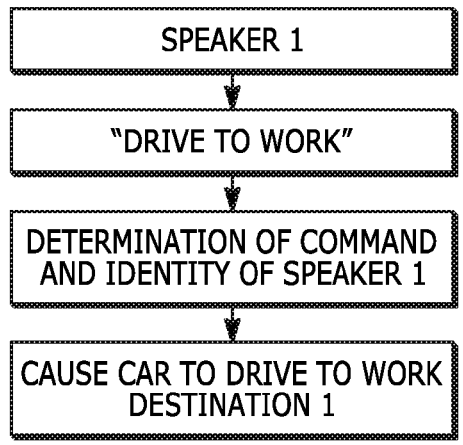
FIGS. 5A, 5B, and 5C comprise simplified examples of at least one embodiment of the computing system of FIG. 1 in operation.
Figure 5B:
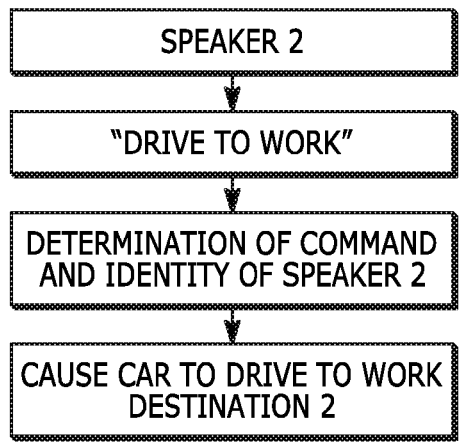

One such example is illustrated in FIGS. 5A and 5B. In this example, two different people may share use of a self-driving car configured to perform joint command and speaker identification as described herein. Both people in this example have trained the car to perform an action in response to the spoken command "drive to work." In the flow chart of FIG. 5A, speaker 1 says "drive to work." The car's spoken command analyzer receives the audio of the spoken command and analyzes it in real time as described herein to determine that the short phase includes the text command of "drive to work" and determines the identity of the speaker as speaker 1. In response to this joint determination, the car is caused to drive to the work destination of speaker 1, being speaker 1's place of work.

In the flow chart of FIG. 5B, speaker 2 says "drive to work" while sitting in the same car. The car's spoken command analyzer receives the audio of the spoken command and analyzes it in real time as described herein to determine that the short phase includes the text command of "drive to work" and determines the identity of the speaker as speaker 2. In response to this joint determination, the car is caused to drive to the work destination of speaker 2, which is different from the work destination of speaker 1, being speaker 2's place of work.

Figure 5C:
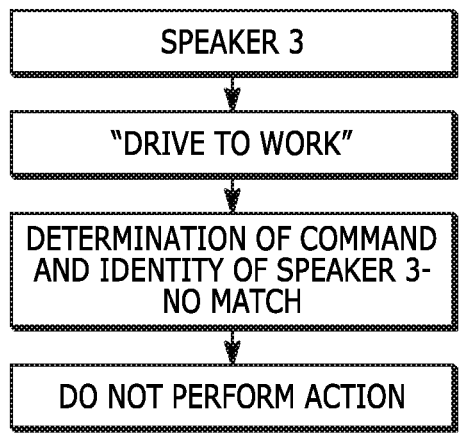

In the flow chart of FIG. 5C, speaker 3 says "drive to work" while sitting in the same car. In this case, speaker 3 is not an authorized user of the car's voice command system. Here, the car's spoken command analyzer receives the audio of the spoken command and analyzes it in real time as described herein to determine that the short phase includes the text command of "drive to work" and determines the identity of the speaker. In contrast to the other examples, here the spoken command analyzer will not return a match because speaker 3's voice characteristics will result in an i-vector that differs from the stored models created by speaker 1 and speaker 2. Because there is no match, the car does not perform an action in response to receipt of speaker 3's speech.

In other examples, because of the increased security available with various approaches, the described technology can be applied as a secure password for various secure transactions such as financial transactions or accessing medical records. Accordingly, these approaches can be applied in any number of real world applications.

IMPLEMENTATION EXAMPLES

Figure 6:
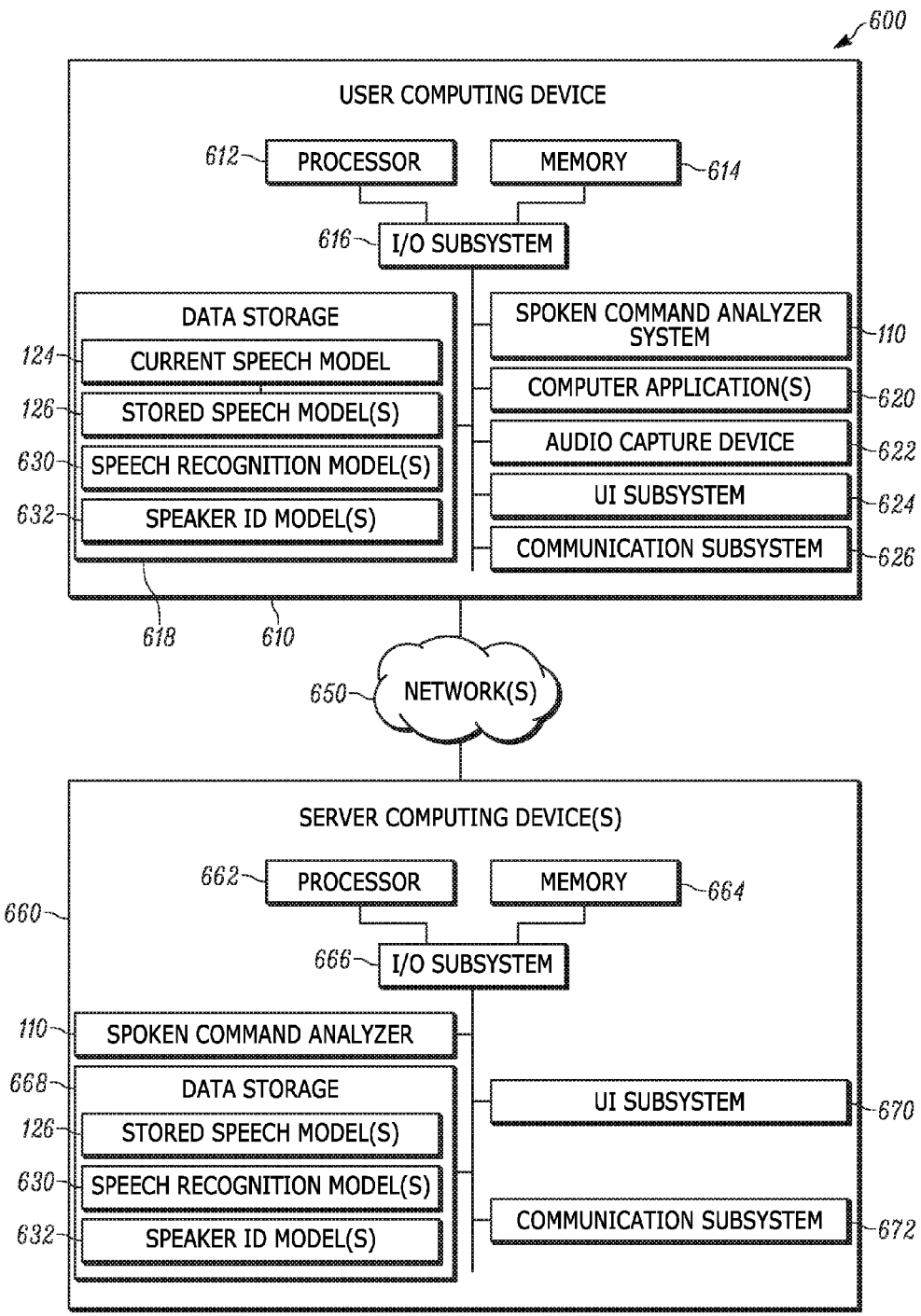
FIG. 6 comprises a simplified block diagram of an exemplary computing environment in connection with which at least one embodiment of the computing system of FIG. 1 may be implemented.

Referring now to FIG. 6, a simplified block diagram of an embodiment 600 of the computing system 100 is shown. While the illustrative computing system 600 is shown as involving multiple components and devices, it should be understood that in some embodiments, the computing system 600 may constitute a single computing device, alone or in combination with other devices. The computing system 600 includes a user computing device 610, which may be in communication with one or more other computing systems or devices 660 via one or more networks 650. The spoken command analyzer 110 or portions thereof may be distributed across multiple computing devices 610, 660 that are connected to the network(s) 650 as shown. In other embodiments, however, the spoken command analyzer 110 may be located entirely on the computing device 610. In some embodiments, portions of the system 110 may be incorporated into other computer applications. As used herein, "computer application" may refer to, among other things, hardware, software, a combination of hardware and software, or any level of software application (e.g., operating system, middleware, libraries, frameworks, and/or interactive user-level applications). For example, portions of the system 110 may be incorporated into or accessed by online banking applications, web-based customer service applications, intelligent assistance applications, and/or others.

The illustrative computing device 610 includes at least one processor 612 (e.g. a microprocessor, microcontroller, digital signal processor, etc.), memory 614, and an input/output (I/O) subsystem 616. The computing device 610 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of hardware and software components and/or other computing systems including the computer application(s) 620 (which may include any other applications residing on the computing device 610), the voice biometric system 110, an audio capture device 622 (e.g., one or more microphones) and the user interface subsystem 624, which includes one or more user input devices (e.g., a touchscreen, keyboard, virtual keypad, etc.) and one or more output devices (e.g., speakers, displays, LEDs, etc.). The I/O subsystem 616 is also communicatively coupled to one or more storage media 618, and a communication subsystem 626. It should be understood that each of the foregoing components and/or systems may be integrated with the computing device 610 or may be a separate component or system that is in communication with the I/O subsystem 616 (e.g., over a network 650 or a serial bus connection).

The storage media 618 may include one or more hard drives or other suitable data storage devices (e.g., flash memory, memory cards, memory sticks, and/or others). In some embodiments, portions of other computer application(s) 620 (e.g., a web-based application, mobile device application, or virtual personal assistant), the spoken command analyzer system 110, the current speech model 124, the stored speech model(s) 126, one or more speech recognition model(s) 630 (including, for example, the acoustic model 116), one or more speaker identification models(s) 632 (including, for example i-vector models and/or others), and/or other data reside at least temporarily in the storage media 618. Portions of the computer application(s) 620, the spoken command analyzer system 110, the current speaker model 124, and the stored speaker model(s) 126, the speech recognition model(s) 630, and the speaker identification models(s) 632, and/or other data may be copied to the memory 614 during operation of the computing device 610, for faster processing or other reasons.

Although various ones of the described examples may be executed entirely on the user computing device 610, in other embodiments various aspects of the process may be executed by other computing devices. To that end, a communication subsystem 626 may communicatively couple the computing device 610 to one or more communication networks 650, e.g., a local area network, wide area network, personal cloud, enterprise cloud, public cloud, and/or the Internet, for example. Accordingly, the communication subsystem 626 may include one or more wired or wireless network interface software, firmware, or hardware, for example, as may be needed pursuant to the specifications and/or design of the particular computing system 600.

The server computing device(s) 660 may be embodied as any suitable type of computing device capable of performing the functions described herein, such as any of the aforementioned types of devices or other electronic devices. For example, in some embodiments, the server computing device(s) 660 may include one or more server computers including storage media 668, which may be used to store portions of the stored speaker model(s) 126, the speech recognition model(s) 630, the speaker identification model(s) 632, and/or other data. The illustrative server computing device 660 also includes a user interface subsystem 670 and a communication subsystem 672, which may be embodied similarly to the components 622, 624, respectively, described above. The computing system 600 may include other components, sub-components, and devices not illustrated in FIG. 6 for clarity of the description. In general, the components of the computing system 600 are communicatively coupled as shown in FIG. 6 by signal paths, which may be embodied as any type of wired or wireless signal paths capable of facilitating communication between the respective devices and components.

ADDITIONAL EXAMPLES

Illustrative examples of the technologies disclosed herein are provided below. An embodiment of the technologies may include any one or more, and any combination of, the examples described below.

A spoken command analyzer module includes instructions embodied in one or more non-transitory machine accessible storage media. The spoken command analyzer module is configured to cause a computing system comprising one or more computing devices to perform operations including receiving data representative of a current speech sample captured by a sound capture device. The spoken command analyzer module uses a model that models both user-specific acoustic properties of one or more prior speech samples and command-specific acoustic properties of the one or more prior speech samples to analyze the data to determine substantive content of the speech and whether the substantive content includes a command to effect an action by an associated device and to analyze the data to determine identity of a human speaker of the speech and whether the identity matches an identity of a user who is authorized to issue the command. In response to determining that the identity matches the authorized user's identity and determining that the data includes the command and determining that the identified user is authorized to issue the command, an instruction is issued to effect performance of the action by the associated device.

The spoken command analyzer module of may be further configured to cause performance of operations including analyzing the data to determine the substantive content of the speech independently of a language of the speech and/or analyzing the data to determine whether the substantive content includes the command to effect the action by the associated device, wherein the command comprises any combination of speech based phonetics.

In other forms, the spoken command analyzer module may be further configured to cause performance of operations including analyzing the data to determine whether the substantive content includes one of a plurality of commands wherein individual ones of the plurality of commands correspond to respective different actions by the associated device. In response to determining that the identity matches the authorized user's identity and determining that the data includes the one of the plurality of commands, the spoken command analyzer module issues an instruction to effect performance of an action by the associated device associated with the one of the plurality of commands in substantially real time relative to capturing the speech.

In other forms, the spoken command analyzer module may be further configured to cause performance of operations including analyzing the data to determine that the speech was non-recorded live speech from a living being human speaker and/or analyzing the data to separate the authorized user's speech data from contemporaneously captured speech from other human speakers.

The operation of analyzing the data to determine whether the substantive content includes the command and the operation of analyze the data to determine the identity of the human speaker of the speech and whether the identity matches the authorized user's identity may include comparing a joint speaker and content model of the data to a stored joint speaker and content model derived from previously analyzed speech of the authorized user to determine both that the speech contains the command and the identity matches the authorized user's identity. The comparing the joint speaker and content model to the stored joint speaker and content model can include using a speaker identification i-vector analysis including a probabilistic linear discriminant analysis.

In still other approaches, the operation of analyzing the data to determine whether the substantive content includes the command and the operation of analyze the data to determine the identity of the human speaker of the speech and whether the identity matches the authorized user's identity includes using a bottleneck in a layer located at a middle layer of or layer in a half-portion of a deep neural network closer to the deep neural network's outer layer. Using the bottleneck may include appending cepstral features to bottleneck features extracted from the deep neural network bottleneck layer.

A method of effecting an action by a device using human speech can include receiving data representative of human speech captured by a sound capture device associated with the device. The method further includes, with at least one computing device, using a model of both user-specific acoustic properties and command-specific acoustic properties of a user's speech to analyze the data to determine substantive content of the speech and whether the substantive content includes a command to effect an action by the device and to analyze the data to determine identity of a human speaker of the speech and whether the identity matches an authorized user's identity. In response to determining that the identity matches the authorized user's identity and determining that the data includes the command, the method includes issuing an instruction to effect performance of the action by the associated device.

In some forms, the method further includes analyzing the data to determine the substantive content of the speech independently of a language of the speech and/or analyzing the data to determine whether the substantive content includes the command to effect the action by the associated device, wherein the command comprises any combination of speech based phonetics.

The method may further include analyzing the data to determine whether the substantive content includes one of a plurality of commands wherein individual ones of the plurality of commands correspond to respective different actions by the associated device. In response to determining that the identity matches the authorized user's identity and determining that the data includes the one of the plurality of commands, the method includes issuing an instruction to effect performance of an action by the associated device associated with the one of the plurality of commands in substantially real time relative to capturing the speech.

The method may further include analyzing the data to determine that the speech was non-recorded live speech from a living being human speaker and/or analyzing the data to separate the authorized user's speech data from contemporaneously captured speech from other human speakers.

Optionally, the analyzing the data to determine whether the substantive content includes the command and the analyzing the data to determine the identity of the human speaker of the speech and whether the identity matches the authorized user's identity includes comparing a joint content and speaker model of the data to a stored joint content and speaker model derived from previously analyzed speech from the authorized user to determine both that the speech contains the command and the identity matches the authorized user's identity.

The analyzing the data to determine whether the substantive content includes the command and the analyzing the data to determine the identity of the human speaker of the speech and whether the identity matches the authorized user's identity are performed by the at least one computing device locally to the device that performs the action associated with the command. The comparing the joint content and speaker model to the stored joint content and speaker model may include using a speaker identification i-vector analysis including probabilistic linear discriminant analysis.

In one form, the method further includes using a bottleneck in a layer located at a middle layer of or layer in a half-portion of a deep neural network closer to the deep neural network's outer layer. The method may further include appending cepstral features to bottleneck features of the bottleneck.

In certain approaches, the method may further include receiving at least three samples of training data representative of speech by the authorized user including the command and analyzing the at least three samples of training data to determine respective stored phonetic models for the command including both content recognition features and speaker recognition features.

An apparatus for performing computing device effected actions may include a sound capture device configured to output data representative of human speech captured by the sound capture device and at least one computing device configured to effect performance of an action response to receipt of a command. The at least one computing device is configured to, jointly, analyze the data to determine substantive content of the speech and whether the substantive content includes the command to effect the action, analyze the data to determine identity of a human speaker of the speech and whether the identity matches an authorized user's identity, and in response to determining that the identity matches the authorized user's identity and determining that the data includes the command, issue an instruction to effect performance of the action.

The at least one computing device may be further configured to analyze the data to determine the substantive content of the speech independently of a language of the speech and/or to analyze the data to determine whether the substantive content includes the command to effect the action by the associated device, wherein the command comprises any combination of speech based phonetics.

The at least one computing device may be further configured to analyze the data to determine whether the substantive content includes one of a plurality of commands wherein individual ones of the plurality of commands correspond to respective different actions by the associated device. In response to determining that the identity matches the authorized user's identity and determining that the data includes the one of the plurality of commands, the at least one computing device is configured to issue an instruction to effect performance of an action by the associated device associated with the one of the plurality of commands in substantially real time relative to capturing the speech.

The at least one computing device is further configured to analyze the data to determine that the speech was non-recorded live speech from a living being human speaker and/or to analyze the data to separate the authorized user's speech data from contemporaneously captured speech from other human speakers.

In one form of the apparatus, the at least one computing device or at least one another computing not located with the apparatus but in communication with the at least one computing device are configured to receive at least three samples of training data representative of speech by the authorized user including the command and analyze the at least three samples of training data to determine respective stored phonetic models for the command including both content recognition features and speaker recognition features.

The analyzing the data to determine whether the substantive content includes the command and the analyzing the data to determine the identity of the human speaker of the speech and whether the identity matches the authorized user's identity optionally includes comparing an i-vector of the data to an i-vector derived from previously analyzed speech from the authorized user to determine both that the speech contains the command and the identity matches the authorized user's identity. The comparing the i-vector may include using a speaker identification i-vector analysis using probabilistic linear discriminant analysis.

The at least one computing device is further configured to use a bottleneck in a layer located at a middle layer of or layer in a half-portion of a deep neural network closer to the deep neural network's outer layer. The at least one computing device may be further configured to append cepstral features to bottleneck features of the bottleneck.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A spoken command analyzer module comprising instructions embodied in one or more non-transitory machine accessible storage media, the spoken command analyzer module configured to cause a computing system comprising one or more computing devices to:
   extract acoustic features from a speech sample;
   in response to input of the acoustic features to a neural network, receive, from the neural network, a temporal sequence of bottleneck features;
   wherein the neural network is trained to discriminate between classes of phonetic units;
   compute statistics using a combination of the acoustic features and the temporal sequence of bottleneck features;
   using the statistics, identify a command contained in the speech sample;
   using the statistics, identify a speaker of the command;
   in response to a comparison of the command and the speaker to a stored model, output, to a device, data that is used by the device to execute an action.

2. The spoken command analyzer module of claim 1, wherein the neural network is language-independent.

3. The spoken command analyzer module of claim 1, wherein the command comprises any combination of speech-based phonetics.

4. The spoken command analyzer module of claim 1, wherein the command is one of a plurality of commands that correspond to different actions that may be taken by the device.

5. The spoken command analyzer module of claim 1, wherein the data comprises an instruction to execute the action.

6. The spoken command analyzer module of claim 1, wherein the speech sample comprises non-recorded live speech of a human speaker.

7. The spoken command analyzer module of claim 1, wherein the speech sample comprises speech of multiple different speakers.

8. The spoken command analyzer module of claim 1, wherein the acoustic features comprise any one or more of the following: cepstral features, Mel frequency cepstral coefficient (MFCC) features, pcaDCT features.

9. The spoken command analyzer module of claim 1, wherein the neural network comprises an input layer and an output layer, and the bottleneck features are extracted from a hidden layer of the neural network that is closer to the input layer than the output layer.

10. The spoken command analyzer module of claim 1, wherein the neural network comprises an input layer and an output layer, and the bottleneck features are extracted from a hidden layer of the neural network that is closer to the output layer than the input layer.

11. The spoken command analyzer module of claim 1, wherein the stored model is created using speech samples obtained during an enrollment process.

12. A method, comprising:
   extracting acoustic features from a speech sample;
   in response to inputting of the acoustic features to a neural network, receiving, from the neural network, bottleneck features;
   wherein the neural network is trained to discriminate between different classes of phonetic units;
   computing statistics using a combination of the acoustic features and the bottleneck features;
   using the statistics, identifying a command contained in the speech sample;
   using the statistics, identifying a speaker of the command;
   in response to a comparison of the command and the speaker to a stored model, outputting, to a device, data that is used by the device to execute an action;
   wherein the method is performed by one or more computing devices.

13. The method of claim 12, wherein the neural network is language-independent.

14. The method of claim 12, wherein the command comprises any combination of speech-based phonetics.

15. The method of claim 12, wherein the command is one of a plurality of commands that correspond to different actions that may be taken by the device.

16. The method of claim 12, wherein the data comprises an instruction to execute the action.

17. The method of claim 12, wherein the speech sample comprises non-recorded live speech of a human speaker.

18. The method of claim 12, wherein the speech sample comprises speech of multiple different speakers.

19. The method of claim 12, wherein the acoustic features comprise any one or more of the following: cepstral features, Mel frequency cepstral coefficient (MFCC) features, pcaDCT features.

20. The method of claim 12, wherein the neural network comprises an input layer and an output layer, and the bottleneck features are extracted from a hidden layer of the neural network that is closer to the input layer than the output layer.

21. The method of claim 12, wherein the neural network comprises an input layer and an output layer, and the bottleneck features are extracted from a hidden layer of the neural network that is closer to the output layer than the input layer.

22. The method of claim 12, wherein the stored model is created using speech samples obtained during an enrollment process.

23. An apparatus, comprising:
   at least one computing device;
   wherein the at least one computing device is coupled to a sound capture device;
   wherein the at least one computing device is configured to:
   extract time-aligned acoustic features from a speech sample captured by the sound capture device;
   in response to input of the time-aligned acoustic features to a neural network, receive from the neural network, bottleneck features;

wherein the neural network is trained to discriminate between classes of phonetic units;

compute statistics using a combination of the acoustic features and the bottleneck features;

using the statistics, identify a command contained in the speech sample;

using the statistics, identify a speaker of the command;

in response to a comparison of the command and the speaker to a stored model, output, to a device, data that is used by the at least one computing device to execute an action.

24. The apparatus of claim 23, wherein the neural network is language-independent.

25. The apparatus of claim 23, wherein the command comprises any combination of speech-based phonetics.

26. The apparatus of claim 23, wherein the command is one of a plurality of commands that correspond to different actions that may be taken by the device.

27. The apparatus of claim 23, wherein the data comprises an instruction to execute the action.

28. The apparatus of claim 23, wherein the speech sample comprises non-recorded live speech of a human speaker.

29. The apparatus of claim 23, wherein the speech sample comprises speech of multiple different speakers.

30. The apparatus of claim 23, wherein the acoustic features comprise any one or more of the following: cepstral features, Mel frequency cepstral coefficient (MFCC) features, pcaDCT features.

31. The apparatus of claim 23, wherein the neural network comprises an input layer and an output layer, and the bottleneck features are extracted from a hidden layer of the neural network that is closer to the input layer than the output layer.

32. The apparatus of claim 23, wherein the neural network comprises an input layer and an output layer, and the bottleneck features are extracted from a hidden layer of the neural network that is closer to the output layer than the input layer.

33. The apparatus of claim 23, wherein the stored model is created using speech samples obtained during an enrollment process.

* * * * *